United States Patent
Peter et al.

(10) Patent No.: US 12,503,546 B2
(45) Date of Patent: Dec. 23, 2025

(54) CURABLE POLYURETHANE PREPOLYMER COMPOSITION

(71) Applicant: Urethane Systems USA LLC, Perth Amboy, NJ (US)

(72) Inventors: Thomas Peter, Southbury, CT (US); Ian Laskowitz, Bantam, CT (US); Margarita Ortiz, Plainville, CT (US); George Brereton, Mahopac, NY (US)

(73) Assignee: Urethane Systems USA LLC, Perth Amboy, NJ (US)

( * ) Notice: Subject to any disclaimer, the term of this patent is extended or adjusted under 35 U.S.C. 154(b) by 410 days.

(21) Appl. No.: 17/909,517

(22) PCT Filed: Mar. 5, 2021

(86) PCT No.: PCT/US2021/021086
§ 371 (c)(1),
(2) Date: Sep. 6, 2022

(87) PCT Pub. No.: WO2021/178800
PCT Pub. Date: Sep. 10, 2021

(65) Prior Publication Data
US 2023/0113087 A1   Apr. 13, 2023

Related U.S. Application Data

(60) Provisional application No. 62/986,140, filed on Mar. 6, 2020.

(51) Int. Cl.
*C08G 18/44* (2006.01)
*C08G 18/12* (2006.01)
*C08G 18/32* (2006.01)

(52) U.S. Cl.
CPC ......... *C08G 18/12* (2013.01); *C08G 18/3243* (2013.01); *C08G 18/44* (2013.01)

(58) Field of Classification Search
CPC ............................ C08G 18/44; C08G 18/3243
See application file for complete search history.

(56) References Cited

U.S. PATENT DOCUMENTS

| | | | |
|---|---|---|---|
| 3,379,693 A * | 4/1968 | Hostettler | ............... C08G 63/08 528/80 |
| 5,077,371 A | 12/1991 | Singh et al. | |
| 6,046,297 A | 4/2000 | Rosenberg et al. | |
| 6,174,984 B1 | 1/2001 | Peter | |
| 6,530,849 B2 | 3/2003 | Peter | |
| 6,964,626 B1 | 11/2005 | Wu et al. | |
| 9,096,707 B2 | 8/2015 | Singh et al. | |
| 2003/0055192 A1 | 3/2003 | Palinkas et al. | |
| 2014/0342110 A1 | 11/2014 | Zhu et al. | |
| 2015/0308044 A1 | 10/2015 | Delmas et al. | |
| 2018/0016382 A1 | 1/2018 | Zhu et al. | |
| 2018/0148534 A1 | 5/2018 | Zhu et al. | |

FOREIGN PATENT DOCUMENTS

| | | | |
|---|---|---|---|
| CN | 104245772 | 12/2014 | |
| CN | 104755521 | 7/2015 | |
| CN | 106133019 | 11/2016 | |
| CN | 107082861 | 6/2017 | |
| CN | 111763297 A * | 10/2020 | ......... C08G 18/4238 |
| WO | WO-9413722 A1 * | 6/1994 | ............. C08G 18/10 |
| WO | 2013122812 A1 | 8/2013 | |

OTHER PUBLICATIONS

CN-111763297-A_Oct. 13, 2020_English Translation.*
International Search Report from corresponding International Application No. PCT/2021/021086, dated Jun. 21, 2021, two pages.
European Search Report from corresponding European Application No. 20167981, dated Sep. 18, 2020, two pages.
Office Action issued May 21, 2025, in corresponding Chinese Application No. 2021800191168 (with English translation), 18 pgs.
Office Action dated Sep. 24, 2025, in Chinese Patent Application No. 202180019116.8 (with English translation) (20 pages).
Du Houjun et al, "Development of a PU Adhesive for Equipment Mounting and Its Reliability Verification", "Polyurethane Industry", vol. 33, No. 2, pp. 24-27, 2018 (with English abstract in last page).

* cited by examiner

*Primary Examiner* — Michael L Leonard
(74) *Attorney, Agent, or Firm* — Oblon, McClelland, Maier & Neustadt, L.L.P.

(57) ABSTRACT

The present invention relates generally to a curable polyurethane prepolymer composition comprising polyurethane prepolymer obtained by the reaction of toluene diisocyanate (TDI) and at least one polyol and an ortho alkyl disubstituted dianiline, preferably 4,4'-methylene-bis-(3-chloro-2,6-diethylaniline) (MCDEA), wherein 50 to 100 wt % of the at least one polyol is at least one polycarbonate polyol.

20 Claims, No Drawings

CURABLE POLYURETHANE PREPOLYMER COMPOSITION

CROSS-REFERENCE TO RELATED APPLICATIONS

The present application is the national stage of international application PCT/US2021/021086, filed on Mar. 5, 2021, and claims the benefit of the filing date of US Prov. Appl. No. 62/986,140, filed on Mar. 6, 2020, the content of each of which is incorporated by reference.

FIELD OF THE DISCLOSURE

The present invention relates generally to a curable polyurethane prepolymer composition comprising polyurethane prepolymer obtained by the reaction of toluene diisocyanate (TDI) and at least one polyol and an ortho alkyl disubstituted dianiline, preferably 4,4'-methylene-bis-(3-chloro-2,6-diethylaniline) (MCDEA), wherein 50 to 100 wt % of the at least one polyol is at least one polycarbonate polyol (PC).

BACKGROUND OF THE INVENTION

Polyurethanes find many applications in the industrial, domestic and medical field, in particular for coatings, adhesives, sealants and elastomers (CASE). However, high temperature conditions (e.g. up to 150° C.) such as in mining industry as well as in oil & gas industry applications (e.g. mud pump pistons, header rings or high temperature seals) is challenging for many polyurethane materials.

Several attempts had been made in the past years to provide polyurethane materials with improved high temperature properties, in particular with improved tear strength after long term usage at high temperatures.

US-A-2003/055192 discloses polyurethane elastomers based on compositions comprising a toluene diisocyanate terminated polyester prepolymer (TDI/polyester), 4,4'-methylene-bis-(2-chloroaniline) (MOCA) as amine curative and a liquid, non-reactive polydimethylsiloxane, that are useful in industrial applications, such as railroad side-bearing pads, skate wheels, tires, track pads, friction brakes, scraper blades, and the like. However, later studies showed that TDI/Polyester+MOCA polyurethanes show poor tear properties after three weeks at high temperatures of 150° C.

U.S. Pat. No. 6,964,626 discloses high temperature polyurethane/urea elastomers for power transmission belts, based on polyisocyanate prepolymer compositions being prepared by reacting a diisocyanate selected from the group consisting of PPDI, 2,6-TDI and a cycloaliphatic diisocyanate with trans or trans, trans geometric structure, with a polyol selected from the group consisting of polycarbonate polyols (PC), polyester polyols, and mixtures thereof, and chain extenders selected from a group consisting of aromatic symmetric primary diamine chain extenders, mixtures of said aromatic symmetric primary diamine chain extenders and aromatic secondary diamine chain extenders, and; mixtures of said aromatic symmetric primary diamine chain extenders and said polyols. According of the patent, 80:20 TDI is not suitable for the invention due to the inferior high temperature stabilities, which is shown in comparative example 19 based on 80:20-TDI, a 40:60 wt % polyol mixture of poly(hexamethylene carbonate) diol and polycaprolactone diol, cured with trimethylene glycol di-para-aminobenzoate (TGDBA) as amine chain extender.

Zhu, Zhenya, Urethane Elastomers for High Temperature Applications. Glen Ellyn, Ill.: PMA, (2006) discloses high temperature urethane elastomers based on PPDI/PC and 4,4'-methylene-bis-(3-chloro-2,6-diethylaniline) (MCDEA) as a curative. He demonstrated that while PPDI based polyurethanes showed good physical properties, polyurethanes based on LF TDI/polyester cured with MOCA or MCDEA aged at 150° C. for 1 to 3 weeks showed inferior high temperature characteristics.

Former studies (such as "Selection of High Temperature Urethanes for Harsh Environments") disclose the use of different curatives, such as MCDEA, MOCA and HQEE in combination with PPDI-based prepolymers (LFP) The use of MCDEA in fact improves the high temperature properties of polyurethanes based on PPDI (such as modulus retention at high temperature, and resistance to heat aging at high temperature). However, one major drawback of curable prepolymer compositions comprising pPDI-polycarbonate and MCDEA as curative is the very short pour life of only 30-45 seconds which makes it very difficult to process. Another major drawback is the inherently high cost of such a system, because of the high price of the specialty diisocyanate monomer PPDI.

WO-A-2013/122812 discloses an elastomeric cover for papermaking rollers or acid picking rollers, the elastomeric cover comprising a polyurethane layer produced by curing a mixed composition comprised of at least a urethane prepolymer obtained by reacting toluene diisocyanate (80% 2,4-toluene diisocyanate and 20% 2,6-toluene diisocyanate) with polycarbonate diol compound and further reacted with a curing agent being a mixture of 3,5-dimethylthio-2,6-toluenediamine and 3,5-dimethylthio-2,4-toluenediamine. However, the document does not disclose a polyurethane obtained by reacting TDI with polycarbonate diol and further reacted with an ortho alkyl disubstituted dianiline such as 4,4'-methylene-bis-(3-chloro-2,6-diethylaniline) (MCDEA).

WO-A-2014/186111 discloses thermoplastic urethanes (TPU) prepared from low free monomer prepolymers that can be prepared by curing and thermally processing to provide a material having excellent properties at high temperature and great efficiency in processing. However, the document does not disclose a polyurethane obtained by reacting TDI with polycarbonate diol and further reacted with 4,4'-methylene-bis-(3-chloro-2,6-diethylaniline) (MCDEA).

US-A-2018/016382 also discloses polyurethane prepolymers based on polycarbonate diols such as PPDI/PC having a low amount of free isocyanate monomer used in the preparation of cast polyurethane polymers with excellent performance by curing the PPDI/PC prepolymer with hydroquinone bis(2-hydroxyethyl) ether (HQEE).

US-A-2018/148534 also discloses polyurethanes based on caprolactam blocked LF prepolymers, e.g. ADIPRENE® LFP R375, PPDI/PC prepolymer having less than 0.1 wt % free PPDI monomer which is blocked with caprolactam, cured with 4,4'-methylene-bis-(3-chloro-2,6-diethylaniline) (MCDEA) such as. Blocked polyurethane systems are typically suitable for thin applications like coatings while for thick elastomer parts (like wheels, mining screens, seals, valve seats, etc.) such approach is not practical because of the difficulty in removing the blocking agent in a thick part. The document is silent about the usability of such a material for high temperature applications.

A need has, therefore, been recognized in connection with overcoming the shortcomings of the state of the art. It is desirable to develop new polyurethanes which have improved high temperature properties such as a high tear strength (trouser tear) at 150° C., and are easy to process. It was thus a further object of the invention to provide a polyurethane which provides such high temperature performance, particularly while avoiding the use of expensive specialty diisocyanates.

Driven by a desire to find a polyurethane which overcomes the shortcomings of the state of the art, surprisingly, it was found that the problem can be solved with a curable prepolymer composition, comprising
(a) Polyurethane prepolymer obtained by the reaction of toluene diisocyanate (TDI) and at least one polyol and
(b) an ortho alkyl disubstituted dianiline, preferably a ortho alkyl disubstituted dianiline of the general Formula (I)

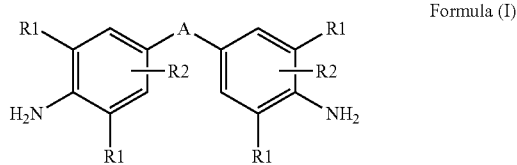

Formula (I)

wherein
R1 represents independent of each other a linear or branched $C_1$-$C_6$ alkyl, R2 represents either hydrogen or halogen, preferably F, Cl, Br or I, more preferably Cl, and
A represents —O—, —CH$_2$—, —C(CH$_3$)$_2$—, —SO$_2$— or —CO$_2$(CH$_2$)$_n$O$_2$C— wherein n represents 1, 2, 3, 4, 5 or 6, preferably 4,4'-methylene-bis-(3-chloro-2,6-diethylaniline) (MCDEA), 4,4'-methylene-bis-(2,6-diethylaniline) (MDEA), 4,4'-methylene-bis-(2,6-diisopropylaniline) and 4,4'-methylene-bis-(2-methyl-6-isopropylaniline) and more preferably 4,4'-methylene-bis-(3-chloro-2,6-diethylaniline) (MCDEA),
wherein 50 to 100 wt % of the at least one polyol is at least one polycarbonate polyol.

For a better understanding of the present invention, together with other and further features and advantages thereof, reference is made to the following description. The scope of the invention will be pointed out in the appended claims.

DETAILED DESCRIPTION OF THE INVENTION

The features and advantages of the present disclosure will be more readily understood, by those of ordinary skill in the art from reading the following detailed description.

Although the preferred embodiments of the present invention are described herein, it is to be understood that the invention is not limited to that precise embodiment, and that various other changes and modifications may be affected therein by one skilled in the art without departing from the scope or spirit of the invention. The following examples are illustrative of a practice of the invention, but are not meant to be considered as limiting the scope of the invention.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments describe herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

Embodiments of the invention exhibit a number of advantages over the prior art.

The term "polyurethane" or "polyurethane polymer" means a polymer having more than one urethane (—N(H)—C(O)—O—) and/or urea (—N(H)—C(O)—N—) bond. Because the structure of a polyurethane can be complex, the polyurethane described herein will also be discussed in terms of the various polyols that are used to form the polyurethane. Examples for polyurethane polymers are polyester polyurethane, polyester urea, polyether polyurethane, and polyether urea.

It is well understood in the art that a polyurethane prepolymer, such as the LF TDI prepolymer of the invention, generally contains, in addition to any particular polyurethane prepolymer compound, other compounds, typically in small amounts. Thus, there should be no confusion when a "polyurethane prepolymer" is said to contain more than a single polyurethane prepolymer molecule, such as other analogous polyurethane prepolymers, unreacted starting materials, side products, solvents, etc.

In the present application, the article "a" or "an" means one or more than one unless otherwise specified, and more than one polyisocyanate monomer may be used in the reaction.

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a).

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

As used herein, the term "embodiment" or "disclosure" is not meant to be limiting, but applies generally to any of the embodiments defined in the claims or described herein. These terms are used interchangeably herein.

As used herein, the term "ASTM" refers to publications of ASTM International. West Conshohocken, Pa.

All industry standards and norms mentioned in the document refer to the version valid at the time of filing the first notification.

As used herein, unless otherwise indicated, the term "wt % NCO" refers to the amount as typically reported on a spec sheet, certificate of analysis or MSDS for a given NCO group or blocked NCO group containing product.

Unless otherwise indicated, conditions of temperature and pressure are ambient or room temperature and atmospheric pressure (101,325 Pa).

The term "room temperature" refers to a temperature of 23° C.±2° C.

Unless otherwise indicated, any term containing parentheses refers, alternatively, to the whole term as if no parentheses were present and the term without them, and combinations of each alternative. Thus, the term "(poly) isocyanate" refers to isocyanate, polyisocyanate, or mixtures thereof.

The terms "percent by weight", "weight percentage (wt %)" and "weight-weight percentage (% w/w)" are used interchangeably herein. Percent by weight refers to the percentage of a material on a mass basis as it is comprised in a composition, mixture or solution. The terms "increased", "enhanced" and "improved" are used interchangeably herein. These terms may refer to, for example, a quantity or activity that is at least 1%, 2%, 3%, 4%, 5%, 6%, 7%, 8%, 9%, 10%, 20%, 30%, 40%, 50%, 60%, 70%, 80%, 90%, 100%, 125%, 150%, 175%, or 200% (or any integer between 1% and 200%) more than the quantity or activity for which the increased quantity or activity is being compared.

As used herein, pot life is define as the amount of time for a curable polyurethane prepolymer composition to reach 20,000 centipoise (mPa*s) as determined with a Brookfield Viscometer at 100° C. or at another temperature as specified. As such the pot life provides a measure for the amount of time available after addition of curative to polyurethane prepolymer during which the mixture can be poured, for example into a mold. The term is also commonly referred to as "working life" or "pour life". The pot life can be adjusted through the use of catalyst, whereby the catalyst promotes the reaction between the curative and the polyurethane prepolymer during curing.

Polyurethane Prepolymer

Toluene Diisocyanate Monomer (TDI)

The polyisocyanate which is used to provide the prepolymer of the present invention is of toluene diisocyanate (TDI). The term TDI comprises all six possible TDI isomers, such as 2,3-TDI, 2,4-TDI, 2,5-TDI, 2,6-TDI, 3,4-TDI and 3,5-TDI as well as mixtures thereof.

In some embodiments, the toluene diisocyanate of the present invention is toluene-2,4-diisocyanate (2,4-TDI; CAS: 584-84-9), toluene-2,6-diisocyanate (2,6-TDI; CAS: 91-08-7) or a mixture thereof.

In certain embodiments, the toluene diisocyanate of the present invention is only toluene-2,4-diisocyanate.

In a particular embodiment, the polyisocyanate is a mixture of 2,4-TDI and 2,6-TDI in a ratio of 90:10 to 50:50, preferably 80:20 to 65:35.

Polycarbonate Polyol

The polyurethane prepolymer of the present invention is obtained by the reaction of toluene diisocyanate with at least one polyol, wherein 50 to 100 wt % of the at least one polyol used in the preparation of the polyurethane prepolymers of the present invention is at least one polycarbonate polyol, preferably an aliphatic polycarbonate polyol such as a poly(hexamethylene carbonate) polyol.

Polycarbonate polyol as used herein refers to a polyol having a backbone comprising mainly carbonate linkages, —O(CO)—O—, as opposed to carboxylate linkages, —O(CO)—R wherein R is a hydrogen or an organic radical bound to the carbonyl by a C—C bond. It also refers to an aliphatic polycarbonate, as opposed to the aromatic polycarbonates used in the plastics industry. Such polycarbonate polyols can be prepared by reaction of glycols, e.g., 1,6-hexylene glycol or 2-methyl-2,4-pentanediol and the like, with organic carbonates, e.g., diphenyl carbonate, dimethyl carbonate, diethyl carbonate, or ethylene carbonate and the like. In more recent effort, polycarbonates are produced using $CO_2$ as a raw material. In a preferred embodiment, the polycarbonate polyol is based primarily on 1,6-hexylene glycol (1,6-hexanediol). In a more preferred embodiment of the invention, the at least one polycarbonate polyol comprises poly(hexamethylene carbonate) diol.

Polycarbonate Polyol Molecular Weight

The polycarbonate polyol of the present invention has a number average molecular weight from 200 g/mol, 250 g/mol or 400 g/mol to 6,000 g/mol or 10,000 g/mol, in some embodiments a lower molecular weight polycarbonate polyol may also be present.

The number average molecular weight can be calculated via hydroxyl number measurement by ASTM E222-94 method.

Preferred Polyurethane Prepolymer

In one particular embodiment, the polyurethane prepolymers is obtained by the reaction of TDI and a 1,000 MW or 2,000 MW poly(hexamethylene carbonate) diol with a molecular weight of 1,000 g/mol or 2,000 g/mol.

In one particular embodiment, the polyurethane prepolymer is a TDI prepolymer prepared using at least one polyol, wherein 50 to 100 wt % of the at least one polyol is at least one polycarbonate polyol, and wherein the polyurethane prepolymer comprises less than 0.1 wt % of free (e.g. unreacted) TDI monomer, based on the total weight of polyurethane prepolymer.

In one embodiment, the polyurethane prepolymer of the present invention consists of the reaction product of TDI and polycarbonate polyol.

In another embodiment, no other polyisocyanate than TDI is present.

Process for Producing Polyurethane Prepolymers

General methods for their preparation of polyurethane prepolymers are known in the art.

Prepolymers according to this invention are prepared by the reaction of an excess of TDI with at least one polyol, wherein 50 to 100 wt % of the at least one polyol is at least one polycarbonate polyol Generally, the polyurethane prepolymers of the present invention are made using standard reaction processes and conditions as known in the art for the production of polyurethane prepolymers generally.

% NCO

The polyurethane prepolymer of the present invention has less than 14 wt. % unreacted NCO groups (free NCO groups).

Preferably, the polyurethane prepolymer of the present invention has no greater than 8.5% NCO, more preferably from 1.0 wt. % to 8.0 wt. %, even more preferably from 2.0 wt. % to 8.0 wt. %.

Free NCO content can be determined by the procedure described in ASTM D1638-70, but employing tetrahydrofuran as the solvent.

The viscosity of the polyurethane prepolymer of the present invention is typically in the range of 300 mPa*s to 6,000 mPa*s at the temperature of use, which is typically an elevated temperature such as 70-100° C. to allow easy mixing.

The viscosity of the polyurethane prepolymer can be measured according to ASTM D4878.

Low-Free (LF) Polyurethane Prepolymer

One preferred prepolymer of the present invention has "low free monomer". These are understood by one of ordinary skill in the art to have lower levels of "free" TDI monomer isocyanate groups than conventional TDI prepolymers, i.e. the compositions of the invention typically have less than 0.1 wt % free TDI monomer, based on the total weight of the polyurethane prepolymer. As an example, free TDI in the polyurethane prepolymer composition may be removed by distillation as is known in the art (U.S. Pat. Nos. 5,077,371, 6,046,297, 6,174,984, 6,530,849), e.g., thin film or agitated film evaporation under vacuum has been used with good success.

Unreacted TDI monomer content of polyurethane prepolymers can be determined by HPLC.

Process for Producing Curable Polyurethane Prepolymer Compositions

In preparing the curable polyurethane prepolymer composition of the present invention, the components can be combined in any order or in any manner. For example, the curative can be mixed with polyurethane prepolymer, e.g. adding the curative to the polyurethane prepolymer or adding the polyurethane prepolymer to the curative. Alternatively, a meter-mix machine may be used to meter and mix the two components (and optional other components such as pigments and additives) simultaneously and continuously and allow continuous filling of molds to obtain higher productivity.

Curable Polyurethane Prepolymer Compositions

The curable polyurethane prepolymer composition of the present invention comprises a prepolymer obtained by the reaction of toluene diisocyanate and at least one polyol, wherein 50 to 100 wt % of the at least one polyol is at least one polycarbonate polyol and an ortho alkyl disubstituted dianiline as curative.

The molar ratio of polyurethane prepolymer to curative in the curable polyurethane prepolymer composition is typically in the range of from 0.5:1 to 1.5:1, preferably from 0.7:1 to 1.2:1 and more preferably from 0.85:1 to 1.1:1.

Additives

Additives, as typically used with polyurethanes, can be optionally present and include, for example, antioxidants, UV stabilizers, light stabilizers, plasticizers, colorants, fillers, lubricants, release agents and catalysts.

Process for Producing Polyurethane

Polyurethanes of the present invention are obtained by reacting a polyurethane prepolymer and a curative (such process being known as "casting" or "curing"). The curing of polyurethane prepolymer with a curative typically progresses in a mold which is often heated up to 100° C. and sometimes up to 140° C. to give network structure to the polyurethanes. Polyurethanes of the present invention can be also cured at lower temperatures compared to PPDI/HQEE which requires higher mold temperatures in order to produced good finished products.

Curative

The curative of the present invention comprises an ortho alkyl disubstituted dianiline, preferably an ortho alkyl disubstituted dianiline of the general Formula (I)

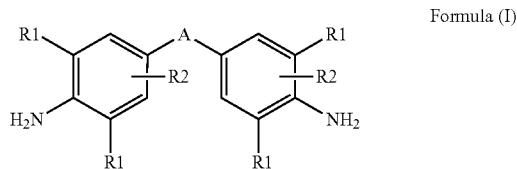

Formula (I)

wherein R1 represents independent of each other a linear or branched $C_1$-$C_6$ alkyl, R2 represents either hydrogen or halogen, preferably F, Cl, Br or I, more preferably Cl, and A represents —O—, —CH$_2$—, —C(CH$_3$)$_2$—, —SO$_2$— or —CO$_2$(CH$_2$)$_n$O$_2$C— wherein n represents 1, 2, 3, 4, 5 or 6.

In a preferred embodiment, the ortho alkyl disubstituted dianiline is selected from a group consisting of 4,4'-methylene-bis-(3-chloro-2,6-diethylaniline) (MCDEA), 4,4'-methylene-bis-(2,6-diethylaniline) (MDEA), 4,4'-methylene-bis-(2,6-diisopropylaniline) and 4,4'-methylene-bis-(2-methyl-6-isopropylaniline) or mixtures thereof.

In a more preferred embodiment, the ortho alkyl disubstituted dianiline is 4,4'-methylene-bis-(3-chloro-2,6-diethylaniline) (MCDEA).

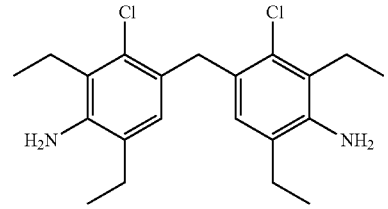

4,4'-methylene-bis-(3-chloro-2,6-diethylaniline) (MCDEA):

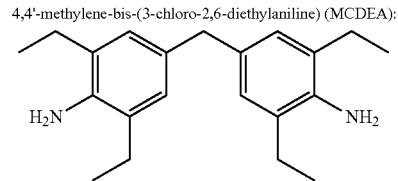

4,4'-methylene-bis-(2,6-diethylaniline) (MCDEA):

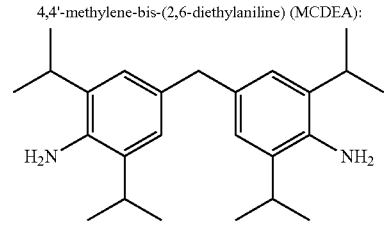

4,4'-methylene-bis-(2,6-diisopropylaniline):

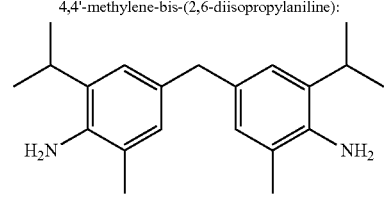

4,4'-methylene-bis-(2-methyl-6-isopropylaniline):

Typically, a casting process may be utilized in which curing between the polyurethane prepolymer and the ortho alkyl disubstituted dianiline curative is performed in a mold. After curing, the polyurethane elastomer formed in the mold is demolded and, optionally, postcured with additional heat and time so as to fully realize the physical properties of the polyurethane's elastomeric network structure.

Polyurethane (Polyurethane Elastomer)

The polyurethanes of the invention can be formed into numerous useful articles. In one embodiment, the formed articles are used in the oil & gas or the mining industry. They can also be used in the automotive and construction industries, as well as other high temperature industries. In one particular embodiment, the articles are mud pump pistons, header rings, high temperature seals, valve seats, belts, wheels, rollers, bushings or bearings intended for high temperature applications.

The invention further relates to an article, preferably a mud pump piston, header ring, seal, valve seat, power transmission belt, wheel, roller, bushing or bearing intended for high temperature applications, comprising the polyurethane elastomer of the present invention. The invention further relates to the use of an article according to the present invention at a temperature of 100-150° C.

Improved Pot Life (of the Curable Composition)

The improved pot life of the curable polyurethane prepolymer composition of the present invention is also a significant advantage for cast polyurethane processors, allowing for better mixing, and for better filling and air escape from molds, and potentially reducing the buildup of cured urethane in mix chambers of meter-mix machines.

High Temperature Properties

The cured polyurethane, based on the polyurethane prepolymer of the present invention has a significantly higher temperature resistance at high temperatures of 150° C., compared to high temperature polyurethanes known from the prior art. In particular, the trouser tear is maintained to a high extent even at exposure to high temperatures over a long time period. Tear strength (Trouser Tear) can be typically tested according to ASTM D1938. Furthermore, the peak stress (tensile strength) is maintained to a high level even after exposure to high temperatures over a long time period. Tensile strength (peak stress) can be typically tested according to ASTM D-412.

Abbreviation

The abbreviation "Comp. Ex." means Comparative Example.

The abbreviation "EW" means equivalent weight.

The abbreviation "MCDEA" means 4,4'-methylene-bis-(3-chloro-2,6-diethylaniline).

The abbreviation "MOCA" or "MbOCA" 4,4'-methylene-bis-(2-chloroaniline).

The abbreviation "PC" means polycarbonate polyol.

The abbreviation "PCL" means polycaprolactone polyol.

The abbreviation "PP" means prepolymer.

The abbreviation "PU" means polyurethane.

The abbreviation "pPDI" or "PPDI" means para-phenylene diisocyanate.

The abbreviation "RT" means room temperature.

The abbreviation "TDI" means toluene diisocyanate.

The abbreviation "TS" means tensile strength.

The present invention is illustrated further by means of the following examples:

EXAMPLES

The following materials were used in the examples:

TDI 80:20 mixture of toluene-2,4-diisocyanate (CAS Nr. 584-84-9) and toluene-2,6-diisocyanate (CAS Nr. 91-08-7) (commercially available at Covestro)

PC poly(hexamethylene carbonate) diol (polycarbonate polyol based on dimethyl carbonate and 1,6-hexanediol) (CAS Nr. 101325-00-2) (commercially available at Covestro)

Prepolymer 1 LF-PPDI/PC prepolymer; (ADIPRENE® LFP R375, commercially available at LANXESS)

Prepolymer 3 LF-MDI/Polyester prepolymer; (ADIPRENE® LFM S350X, commercially available at LANXESS)

Prepolymer 4 LF-PPDI/Polyester prepolymer; (ADIPRENE® LFP S310, commercially available at LANXESS)

Prepolymer 5 LF-TDI/Polyester prepolymer; (ADIPRENE® LF 1900A, commercially available at LANXESS)

Prepolymer 6 LF-TDI/PCL prepolymer; (ADIPRENE® LF 2600A, commercially available at LANXESS)

Prepolymer 7 LF-MDI/PCL prepolymer; (ADIPRENE® $C_{930}$, commercially available at LANXESS)

MCDEA curative; 4,4'-methylene-bis-(3-chloro-2,6-diethylaniline) (CAS Nr. 106246-33-7) (commercially available at LONZA under the tradename Lonzacure® M-CDEA)

HQEE curative; hydroquinone bis(2-hydroxyethyl) ether (CAS Nr. 104-38-1) (commercially available at LANXESS under the tradename Vibracure® 2101)

MOCA curative; 4,4'-methylene-bis-(2-chloroaniline) (CAS Nr. 101-14-4) (commercially available at LANXESS).

Testing Methods

Free NCO content (NCO %)

Free NCO content (wt. %) can be determined by the procedure described in ASTM D1638-70, but employing tetrahydrofuran as the solvent.

Amount of Free Polyisocyanate Monomer

Unreacted TDI monomer content of polyurethane prepolymers is determined by HPLC.

Hardness

Hardness of cured polymer samples is determined using a Type A durometer (Pacific Transducer, Model 306L) according to ASTM 2240-85.

Trouser Tear

Tear strength was tested according to ASTM D1938 (Trouser Tear).

Peak Stress

Tensile strength (peak stress) was tested according to ASTM D-412 (Tensile).

The measurements were performed in an Instron 5969 Universal Material Testing Machine using advance video extensometer (AVE2).

The low monomeric TDI content polyurethane prepolymers of the present invention were prepared according to the following general polyurethane prepolymer synthesis procedure.

The following polyurethane prepolymers were prepared.

Preparation of prepolymer 2 (PP2)

The polyurethane prepolymer PP2 was prepared by reacting the PC with excess TDI at temperatures in the rage of from 60° C. to 85° C. The reaction mixture was held at the reaction temperature for 2 hours with agitation.

Removal of Unreacted Polyisocyanate Monomer from Polyurethane Prepolymer

Unreacted polyisocyanate monomer was then removed by a wiped film evaporator in accordance with the procedure described in U.S. Pat. No. 4,182,825 at jacket temperatures of 150-160° C.

Polyurethane from Polyurethane Prepolymer

The polyurethane prepolymer was added to the curative (HQEE, MCDEA or MOCA; 98% stoichiometry). The mixture was fully agitated, poured into molds, and cured/post cured at 100° C. for 24 hours after which the polyurethane was removed from the mold (=demolded).

TABLE 1

Curable polyurethane prepolymer composition and polyurethane characteristics

| Material | PU1 | PU2 | PU3 | PU4* | PU5 | PU6 | PU7 | PU8 | PU9 | PU10 |
|---|---|---|---|---|---|---|---|---|---|---|
| Prepolymer | PP1 | PP1 | PP1 | PP2 | PP2 | PP3 | PP4 | PP5 | PP6 | PP7 |
| Polyisocyanate | PPDI | PPDI | PPDI | TDI | TDI | MDI | PPDI | TDI | TDI | MDI |
| Polyol | PC | PC | PC | PC | PC | Polyester | Polyester | Polyester | PCL | PCL |
| NCO % | 3.79 | 3.79 | 3.79 | 4.06 | 4.06 | 3.50 | 3.10 | 4.20 | 3.30 | 4.50 |
| Free NCO-monomer [wt %] | <0.1 | <0.1 | <0.1 | <0.1 | <0.1 | <0.1 | <0.1 | <0.1 | <0.1 | >1 |
| Curative | HQEE | MCDEA | MOCA | MCDEA | MOCA | MCDEA | MCDEA | MCDEA | MCDEA | MCDEA |

PP = prepolymer;
*inventive example

Heat Soak Tests

The test articles were casted and the parts were stored at room temperature for 1 week. Afterwards, the articles were heat soaked in same oven for 1-8 weeks at 150° C. The articles were tested at ambient conditions (room temperature and atmospheric pressure) after ASTM conditioning. In parallel, after ASTM conditioning, articles were tested at 150° C. after 5 minute soak. A verified equilibrium occurred at 3 minutes.

TABLE 2

Trouser tear test results ([kN/m]) measured at room temperature

| Material | PU1 | PU2 | PU3 | PU4* | PU5 | PU6 | PU7 | PU8 | PU9 | PU10 |
|---|---|---|---|---|---|---|---|---|---|---|
| No soak | 44.0 | 20.3 | 46.1 | 30.3 | 35.7 | 21.4 | 24.9 | 37.0 | 25.2 | 27.2 |
| 1 week soak | 128 | n.m. | n.m. | 87.5 | n.m. | n.m. | n.m. | n.m. | n.m. | n.m. |
| 2 week soak | 130 | n.m. | n.m. | 87.7 | n.m. | n.m. | n.m. | n.m. | n.m. | n.m. |
| 3 week soak | n.m. | 103.0 | 87.7 | n.m. | 62.3 | n.m. | n.m. | n.m. | n.m. | n.m. |
| 4 week soak | 133 | n.m. | n.m. | 78.2 | n.m. | 32.1 | 30.2 | 11.9 | 33.8 | 32.6 |
| 6 week soak | 136 | 92.3 | 97.5 | 62.4 | 29.8 | 19.5 | 76.8 | 13.1 | 18.6 | 16.3 | n.m. = not measured;
*inventive example

After 6 weeks soak at room temperature, the PPDI-based polyurethanes PU1 to PU3 have higher and thus better trouser tear properties than the inventive PU4 based on LF-TDI/PC+MCDEA.

TABLE 3

Trouser tear test results ([kN/m]) measured at 150° C.

| Material | PU1 | PU2 | PU3 | PU4* | PU5 | PU6 | PU7 | PU8 | PU9 | PU10 |
|---|---|---|---|---|---|---|---|---|---|---|
| No soak | 8.8 | 4.0 | 7.5 | 11.2 | 3.3 | 6.1 | 7.0 | 8.8 | n.m. | 12.8 |
| 1 week soak | 13.7 | n.m. | n.m. | 55.2 | n.m. | n.m. | n.m. | n.m. | n.m. | n.m. |
| 2 week soak | 12.1 | n.m. | n.m. | 52.1 | n.m. | n.m. | n.m. | n.m. | n.m. | n.m. |
| 3 week soak | n.m. | 46.4 | 22.6 | n.m. | 15.1 | n.m. | n.m. | n.m. | n.m. | n.m. |
| 4 week soak | 8.1 | n.m. | n.m. | 39.1 | n.m. | 8.1 | 5.8 | n.m. | 5.4 | 6.3 |
| 6 week soak | 7.2 | 28.7 | 18.7 | 31.4 | 4.2 | 2.3 | 4.0 | n.m. | 1.8 | 2.5 | n.m. = not measured;
*inventive example

After 6 weeks soak at elevated temperature of 150° C., the inventive LF-TDI/PC+MCDEA PU4 has higher and thus better trouser tear properties than the LF-PPDI/PC+MCDEA PU2, LF-TDI/PC+MOCA PU5 and LF-TDI/PCL+MCDEA PU9. All non-inventive polyurethanes PU1 to PU3 and PU5 to PU10 show low and thus inferior trouser tear properties at elevated temperatures of 150° C.

TABLE 4

Peak stress (tensile strength) test results ([MPa]) measured at room temperature

| Material | PU1 | PU4* | PU6 | PU7 | PU8 | PU9 | PU10 |
|---|---|---|---|---|---|---|---|
| No soak | 42.4 | 43.1 | 36.9 | 41.2 | 48.2 | 33.0 | 39.4 |
| 1 week soak | 49.8 | 47.2 | n.m. | n.m. | n.m. | n.m. | n.m. |
| 2 week soak | 43.8 | 44.5 | n.m. | n.m. | n.m. | n.m. | n.m. |
| 4 week soak | 37.1 | 39.7 | 15.2 | 21.6 | 4.7 | 13.1 | 28.4 |
| 6 week soak | 34.4 | 31.6 | 9.6 | 18.3 | 4.1 | 12.9 | 15.8 | n.m. = not measured;
*inventive example

After 6 weeks soak at room temperature, the PPDI/polycarbonate+HQEE PU1 has very similar tensile strength properties as the inventive LF-TDI/PC+MCDEA PU4.

TABLE 5

Peak stress (tensile strength) test results ([MPa]) measured at 150° C.

| Material | PU1 | PU4* | PU6 | PU7 | PU8 | PU9 | PU10 |
|---|---|---|---|---|---|---|---|
| No soak | 8.5 | 11.2 | 7.0 | 7.7 | 9.5 | n.m. | 14.3 |
| 1 week soak | 9.4 | 11.8 | n.m. | n.m. | n.m. | n.m. | n.m. |
| 2 week soak | 8.4 | 11.1 | n.m. | n.m. | n.m. | n.m. | n.m. |
| 4 week soak | 7.1 | 9.1 | 4.5 | 5.7 | n.m. | 4.4 | 5.8 |
| 6 week soak | 7.1 | 7.0 | 2.6 | 5.0 | n.m. | 3.5 | 4.8 | n.m. = not measured;
*inventive example

After 6 weeks soak at elevated temperature of 150° C., the inventive LF-TDI/PC+MCDEA PU4 has higher and thus better tensile strength properties than the LF-PPDI/PC+HQEE PU 1. Non-inventive polyurethanes PU6 to PU10 show low and thus inferior tensile strength properties at elevated temperatures of 150° C.

What is claimed is:

1. A curable polyurethane prepolymer composition, comprising:
a polyurethane prepolymer obtained by reacting components comprising a toluene diisocyanate and a polyol; and
an ortho alkyl disubstituted dianiline of formula (I)

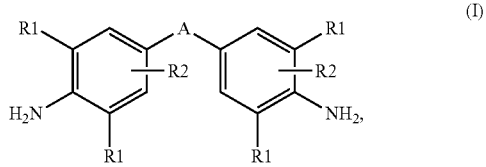

(I)

RI independently being a linear $C_1$-$C_6$ alkyl, branched $C_1$-$C_6$ alkyl, R2 being hydrogen or halogen, and A being —O—, —CH$_2$—, —C(CH$_3$)$_2$—, —SO$_2$—, or —CO$_2$(CH$_2$)$_n$O$_2$C—, with n being 1, 2, 3, 4, 5 or 6.
wherein the polyol comprises a polycarbonate polyol in a range of from 50 to 100 w wt. %, based on total polyol weight, and
wherein the polyurethane prepolymer comprises less than 0.1 wt. % of free TDI monomer, based on a total weight of the polyurethane prepolymer.

2. The composition of claim 1, wherein, in the ortho alkyl disubstituted dianiline of formula (I),
R1 is independently a linear $C_1$-$C_6$ alkyl,
R2 is either hydrogen or halogen, and
A is —CH$_2$— or —C(CH$_3$)$_2$—.

3. The composition of claim 1, wherein the ortho alkyl disubstituted dianiline comprises 4,4'-methylene-bis-(3-chloro-2,6-diethylaniline), 4,4'-methylene-bis-(2,6-diethylaniline), 4,4'-methylene-bis-(2,6-diisopropylaniline), and/or 4,4'-methylene-bis-(2-methyl-6-isopropylaniline).

4. The composition of claim 1, wherein the ortho alkyl disubstituted dianiline is 4,4'-methylene-bis-(3-chloro-2,6-diethylaniline).

5. The composition of claim 1, wherein the polycarbonate polyol comprises poly(hexamethylene carbonate) diol.

6. The composition of claim 1, wherein the toluene diisocyanate comprises toluene-2,4-diisocyanate and toluene-2,6-diisocyanate.

7. The composition of claim 1, wherein a molar ratio of the polyurethane prepolymer to a curative is in a range of from 0.5:1 to 1.5:1.

8. The composition of claim 1, wherein the polyurethane prepolymer has a free NCO content (NCO %) of no greater than 8.5% NCO.

9. The composition of claim 1, wherein the polyol is poly(hexamethylene carbonate) diol, and
wherein the ortho alkyl disubstituted dianiline is 4,4'-methylene-bis-(3-chloro-2,6- diethylaniline).

10. A process for preparing a polyurethane elastomer, the process comprising:
reacting the polyurethane prepolymer and curative of the curable polyurethane prepolymer composition of claim 1 to form a polyurethane elastomer.

11. A polyurethane elastomer, prepared by the process of claim 10.

12. An article comprising:
the polyurethane elastomer of claim 11.

13. A curable polyurethane prepolymer composition, comprising:
a polyurethane prepolymer comprising, in polymerized form, a toluene diisocyanate and a polyol; and
an ortho alkyl disubstituted dianiline of formula (I)

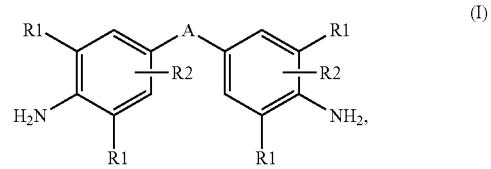

(I)

R1 independently being a linear $C_1$-$C_6$ alkyl, branched $C_1$-$C_6$ alkyl, R2 being hydrogen or halogen, and A being —O—, —CH$_2$—, —C(CH$_3$)$_2$—, —SO$_2$—, or —CO$_2$(CH$_2$) nO$_2$C—, with n being 1, 2, 3, 4, 5 or 6,
wherein the polyol comprises polycarbonate polyol in a range of from 50 to 100 wt. %, based on total polyol weight,
wherein the polyurethane prepolymer comprises less than 0.1 wt. % of free TDI monomer, based on total polyurethane prepolymer weight, and
wherein the polycarbonate polyol comprises poly(hexamethylene carbonate) diol.

14. The composition of claim 13, wherein, in the ortho alkyl disubstituted dianiline of formula (I):
R1 is independently a linear $Ci_1$-$C_6$ alkyl,
R2 is hydrogen or halogen, and
A is —$CH_2$— or —$C(CH_3)_2$—.

15. The composition of claim 12, wherein the ortho alkyl disubstituted dianiline comprises 4,4'-methylene-bis-(3-chloro-2,6-diethylaniline), 4,4'-methylene-bis-(2,6- diethylaniline), 4,4'methylene-bis-(2,6-diisopropylaniline), and/or 4,4'-methylene-bis-(2- methyl-6-isopropylaniline).

16. The composition of claim 13, wherein the ortho alkyl disubstituted dianiline is 4,4'-methylene-bis-(3-chloro-2,6-diethylaniline).

17. The composition of claim 1, wherein, in the ortho alkyl disubstituted dianiline of formula (I),
R1 is independently a branched $C_1$-$C_6$ alkyl,
R2 is either hydrogen or halogen, and
A is —$CH_2$— or —$C(CH_3)_2$—.

18. The composition of claim 13, wherein, in the ortho alkyl disubstituted dianiline of formula (I),
R1 is independently a branched $C_1$-$C_6$ alkyl,
R2 is either hydrogen or halogen, and
A is —$CH_2$— or —$C(CH_3)_2$—.

19. The composition of claim 1, wherein R2 is Cl.

20. A mud pump piston, header ring, seal, valve seat, power transmission belt, wheel, roller, bushing, or bearing, comprising:
the polyurethane elastomer of claim 11.

* * * * *